United States Patent [19]

Lichman

[11] Patent Number: 5,414,674
[45] Date of Patent: May 9, 1995

[54] RESONANT ENERGY ANALYSIS METHOD AND APPARATUS FOR SEISMIC DATA

[75] Inventor: Eugene Lichman, Houston, Tex.

[73] Assignee: Discovery Bay Company, Houston, Tex.

[21] Appl. No.: 150,480

[22] Filed: Nov. 12, 1993

[51] Int. Cl.⁶ .............................................. G01V 1/30
[52] U.S. Cl. ...................................... 367/49; 367/21; 364/421
[58] Field of Search .................... 367/21, 49; 364/421, 364/422; 382/43

[56] References Cited

U.S. PATENT DOCUMENTS

| | | |
|---|---|---|
| 4,316,267 | 2/1982 | Ostrander . |
| 4,316,268 | 2/1982 | Ostrander . |
| 4,380,929 | 4/1983 | Taszorch et al. ............ 73/579 |
| 4,694,438 | 9/1987 | Sengupta . |
| 4,713,616 | 12/1987 | Shinazahi et al. .......... 324/309 |
| 4,884,247 | 11/1989 | Hadidi et al. ............... 367/47 |
| 4,984,567 | 1/1991 | Kogeyama et al. ........ 128/660.02 |
| 5,077,697 | 12/1991 | Chang . |
| 5,081,612 | 1/1992 | Scott et al. . |
| 5,195,138 | 3/1993 | Kane et al. ................. 381/46 |
| 5,351,544 | 10/1994 | Endo et al. ................. 73/588 |

Primary Examiner—Nelson Moskowitz
Attorney, Agent, or Firm—Fish & Richardson

[57] ABSTRACT

The invention is a method and apparatus for conducting seismic analysis of underground formations that offers improved accuracy in locating strata that contain natural gas in paying quantities. The method analyzes the resonant response generated when a seismic wave passes through a given stratum. Seismic data are collected using conventional field acquisition methods. Following conventional preprocessing, the seismic response data are mapped onto the quefrency domain in order to separate the resonant and non-resonant components of the reflected energy. Strata that consist of predominantly elastic materials (solids and liquids) resonate in discrete frequency bands, which are represented by a quefrency spectrum with a large amplitude at high-quefrency values. Gas-bearing strata have more plastic properties, and emit a more uniform response that lacks distinct resonant peaks. The quefrency spectrum of gas-bearing strata contains a relatively higher amplitude at low-quefrency values. Therefore, strata having high concentration of natural gas hydrocarbons are located by detecting seismic data having quefrency distributions weighted toward the lower quefrencies.

12 Claims, 7 Drawing Sheets

RESONANT ENERGY ANALYSIS METHOD AND APPARATUS FOR SEISMIC DATA

BACKGROUND OF THE INVENTION

The invention relates to detection of subsurface hydrocarbons. More particularly, the invention relates to an improved method and apparatus for locating strata that contain natural gas in paying quantities.

In the field of hydrocarbon exploration, the earliest uses of seismic data focused on mapping the structural position of subsurface formations based on the two-way travel time of seismic signals that reflect off underground rock layers. With refinement of seismic exploration methods, interpreters noted a correlation between certain characteristics of the seismic signal and the presence of hydrocarbons in the subsurface. This approach to interpreting seismic data generally is called "direct hydrocarbon indication," and focuses on how the presence of hydrocarbons, especially natural gas, affects the amplitude, frequency, phase and other dynamic characteristics of the seismic signal.

The most widely used direct hydrocarbon indication analysis focuses on the amplitudes of return signals. Natural gas reservoirs can generate a large reflected signal, known as a "bright spot" on the seismic line. Reflections occur when compression waves pass from one medium into a second medium with different physical characteristics such as density and the velocity at which sonic waves propagate through the medium. However, bright spot analysis is an imperfect means of detecting gas because bright spots are not necessarily indicative of a gas field, but also can result from adjacent strata with sufficiently different physical characteristics.

One approach that improves on the basic bright spot search technique is called Amplitude Versus Offset (AVO). The subject of a 1984 article by Ostrander entitled "Plane-wave reflection coefficients for gas sounds at non-normal angles of incidence," 49 Geophysics, 1637, (1984), this approach capitalizes on the phenomenon that gas-bearing strata generate a reflection whose amplitude varies according to the angle of incidence of the incoming waveform. In contrast, bright spots generated at the interface of two incompressible substances, such as a stratum of light rock that overlays a stratum of dense rock, show little amplitude variance as the incidence angle changes. To differentiate the two types of bright spots, the geophysicist need only vary his source and receiver positions so as to bounce seismic waves off the same stratum from a variety of angles, and inspect the reflected signals for a strong amplitude change as a function of the angle.

A second approach to direct hydrocarbon indication is to analyze the frequency content of the seismic signal. The presence of natural gas affects the frequency content of the seismic wave by increasing the rate of energy absorption as a function of increasing frequency. Direct hydrocarbon indication techniques that use frequency analysis focus on two areas: (1) detecting anomalous rates of energy decay in the seismic waveform (the "inverse Q method"), and (2) detecting a downshift in the dominant frequency that is commonly associated with natural gas deposits. Frequency analysis is particularly effective when used in conjunction with other approaches that interpret the amplitude of the returned waveform over time, namely, bright spot and AVO techniques.

Phase response is a third characteristic of the seismic waveform that has been used as a direct hydrocarbon indicator. In many cases, a gas accumulation in a subsurface stratum will cause a phase reversal between signals in a stacked seismic array. This approach is particularly useful where a porous stratum runs at an angle to horizontal, causing a lower portion of the stratum to be brine-filled and a higher portion to be gas-filled.

These conventional technologies have certain limitations in practice. Depth is a primary constraint. The AVO technique becomes increasingly unreliable at greater depths because, as a matter of geometry, the source and receiver must be placed further apart to obtain the required angle of incidence and reflection. Depth also creates serious problems with the inverse Q method. High frequency signals are attenuated more rapidly than lower frequencies, even when propagating through non-gas-bearing media. At increasing depth, the cumulative attenuation of energy levels at the high-frequency end of the spectrum makes detection of anomalous energy absorption unreliable.

In addition to these depth-related problems, the direct hydrocarbon indication techniques described above are problematic in that they do not discriminate well between high and low levels of gas saturation. Gas saturation, which is a measure of the volume of gas versus the volume of rock matrix plus other fluids, is a fundamental variable for determining the potential recovery of hydrocarbon from subsurface reservoirs. Both the seismic energy attenuation and seismic amplitude detection methods attain anomalous response levels at a relatively low gas saturation. Therefore, These techniques cannot provide an accurate indicator of gas saturation.

SUMMARY OF THE INVENTION

The invention overcomes the above-described disadvantages of the prior art by providing a method and apparatus which can reliably locate high-density hydrocarbon deposits. Specifically, according to one aspect of the invention, a method of locating high-density hydrocarbon deposits is provided comprising the steps of: a) obtaining analog signal representative of seismic information; b) converting the analog signal to digital signals; c) interpolating data points along one of the digital signals within a predetermined time window; d) conducting a resonant energy analysis of the digital signals within the predetermined time window, the analysis comprising forming a plot of the digital signal in the quefrency domain, separating the plot into resonant and non-resonant portions, and determining a ratio of the area under the resonant portion to the area under the non-resonant portion; e) repeating steps c and d for each of the digital signals; and f) locating high-density hydrocarbon deposits by choosing areas having a high value of the ratio.

In some embodiments, the method further comprises the step of stacking corresponding digital signals prior to interpolation. In some embodiments, the method further comprises the step of pre-stack processing of the digital signals, which may include performing phase-inversion deconvolution. In some embodiments, the method further comprises the step of color-coding the ratios and generating a trace of the ratios for a desired geographical area, and may include the step of displaying the trace on a color display.

In another aspect of the invention, an apparatus for locating high-density hydrocarbon deposits from analog signals is provided, which comprises: means for converting the analog signal to digital signals; means for interpolating data points along one of the digital signals within a predetermined time window; means for conducting a resonant energy analysis of the digital signal within the predetermined time window, comprising: means for forming a plot of the signal in the quefrency domain, means for separating the plot into resonant and non-resonant portions, and means for determining a ratio of the area under the resonant portion to the area under the non-resonant portion; and means for locating high-density hydrocarbon deposits by choosing areas having a high value of the ratio.

In some embodiments, the apparatus further comprises means for stacking corresponding digital signals prior to interpolation. In some embodiments, the apparatus further comprises pre-stack processing means, which may include means for performing phase-inversion deconvolution. In some embodiments, the apparatus comprises means for color-coding the ratios and generating a trace of the ratios for a desired geographical area. In some embodiments, the invention comprises a color display for displaying the trace.

BRIEF DESCRIPTION OF THE DRAWING

FIG. 7a is a graph illustrating a quefrency distribution of the data shown in FIG. 6a;

FIG. 7b illustrates resonant, non-resonant, and wavelet portions of the quefrency distribution for FIG. 7a;

FIG. 8b illustrates resonant, non-resonant, and wavelet portions of the quefrency distribution for FIG. 8a.

DESCRIPTION OF THE PREFERRED EMBODIMENTS

Preferred embodiments of the invention will now be described in detail with reference to the accompanying figures.

The present invention relates to a method for determining compositional properties of subsurface strata, using conventional time domain seismic data in digital format. A set of seismic signals is obtained that includes signals that have been generated by the resonance in the strata. The digital signal is interpolated to construct a sufficient effective sampling rate to attain reliable frequency spectra within short time windows. A frequency spectrum is generated for every data point in the original sample by conducting a forward Fourier transform. The Fourier transform uses interpolated data values that lie within a time window that is centered about the original data point.

The frequency spectrum derived in this manner for given strata contains two components, corresponding to the elastic and plastic materials contained in the strata. Elastic materials, which include solids and liquids, tend to distribute transmitted acoustic energy into discrete resonant frequencies. This comprises the resonant component. Plastic materials, including gases, distribute energy in a generally uniform fashion across a wide range of frequencies. This is the non-resonant component. A composite formation, such as a porous rock containing gas concentrations, will distribute energy in a linear combination of these two types of distributions.

In the frequency domain, the resonant component is distinguished from the non-resonant component by the sharpness of the rate of change of amplitude with respect to frequency. The resonant and non-resonant components are separated by mapping the spectrum onto the "quefrency" domain. This mapping consists of a second forward Fourier transform of the amplitude of the frequency spectrum. The quefrency distribution contains three distinguishable areas: a low quefrency component associated with the wavelet itself, a middle quefrency region associated with resonance of plastic material, and a high-quefrency component associated with the resonance of elastic material. The quefrency distribution therefore separates the elastic and plastic components of the frequency distribution into different portions of the distribution curve. The ratio of areas under the plastic portion of the curve and the elastic portion of the curve define the proportion of plastic versus elastic material in the strata. Preferably, the calculated plastic/elastic ratios are displayed as a color-coded image. High ratio areas are likely to indicate areas of high gas saturation.

Figure 1:
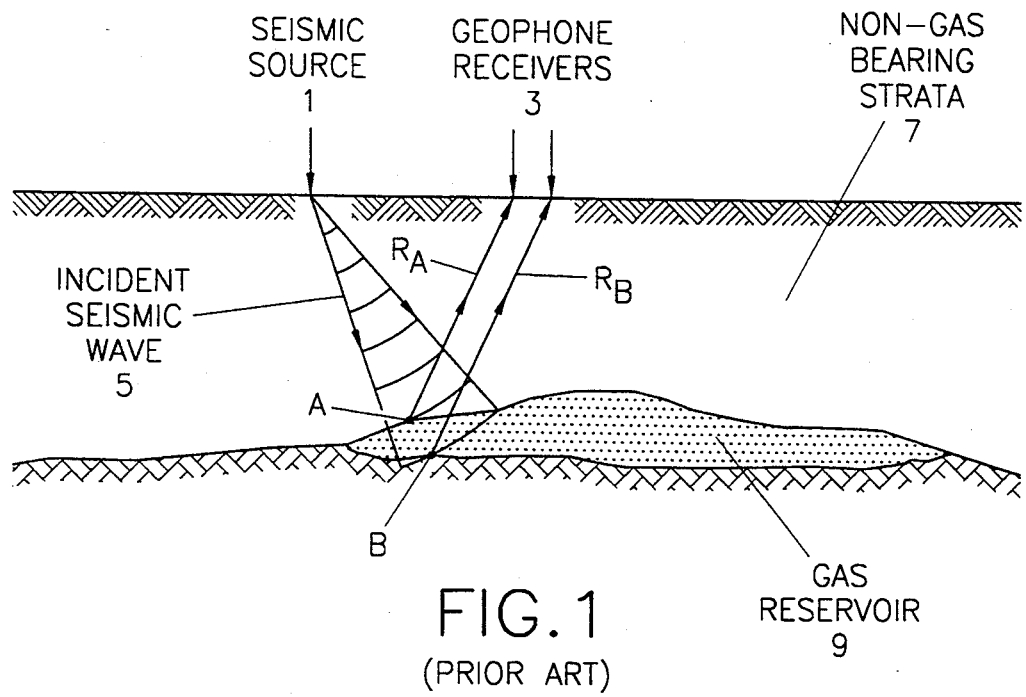
FIG. 1 is a schematic diagram illustrating a conventional seismic survey technique.

In operation, the seismic data are first collected using a conventional survey technique. One such technique, illustrated in FIG. 1, uses a seismic source 1 and a plurality of geophone receivers 3 displaced horizontally on the earth's surface. The seismic source 1 generates a pressure seismic wave 5 which is reflected, for example, at point A on the boundary between non-gas-bearing stratus 7 and gas reservoir 9 and at point B, on the lower boundary of gas reservoir 9. The reflections from points A and B generate reflected waves $R_A$ and $R_B$, which are detected by geophone receivers 3 on the surface. Timing, amplitude, phase, and frequency information of the reflected waves $R_A$ and $R_B$ may then be used to determine the characteristics of gas reservoir 9. Preferably, measurements are taken with the seismic source 1 disposed at a number of different locations. This allows "stacking" of the data to increase signal to noise ratio.

Figure 2:
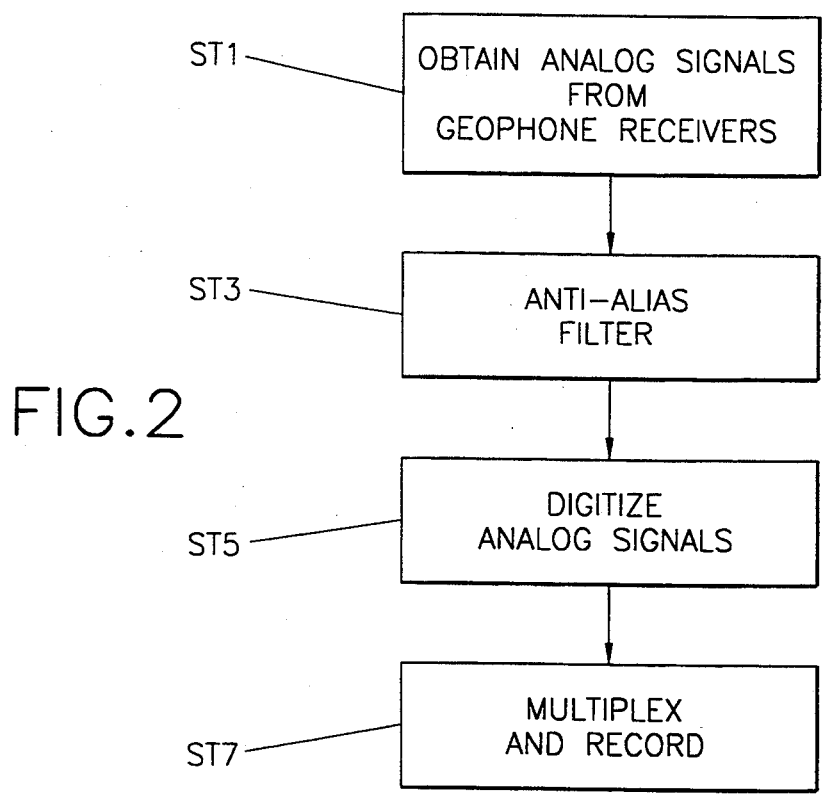
FIG. 2 is a flow chart illustrating a preferred method of obtaining and storing seismic signals on site.

The geophone receivers 3 operate to convert sound wave pressure into analog electrical signal. Referring to FIG. 2, once these signals are obtained (ST1), they are subjected to an anti-alias filter (ST3) and are digitized (ST5). Digital sampling is performed at an interval of, for example, 1–4 milliseconds. The digital data for each signal are then multiplexed and recorded on a portable storage device (ST7).

Figure 3:
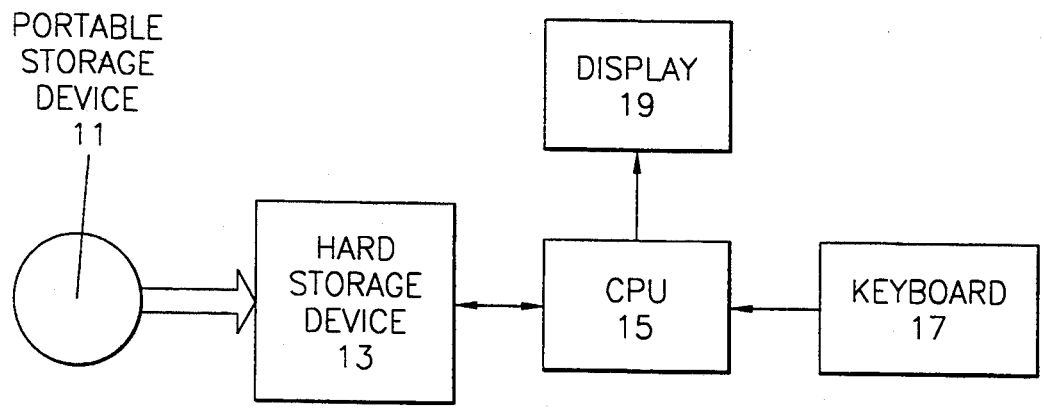
FIG. 3 is a block diagram of a seismic data processing device.

Once surveying is completed, the multiplexed signals are downloaded from portable storage device 11 to a hard storage device 13 as shown in FIG. 3. Hard storage device 13 is in communication with a central processing unit (CPU) 15, display 19, and keyboard 17 in a conventional manner.

Figure 4:
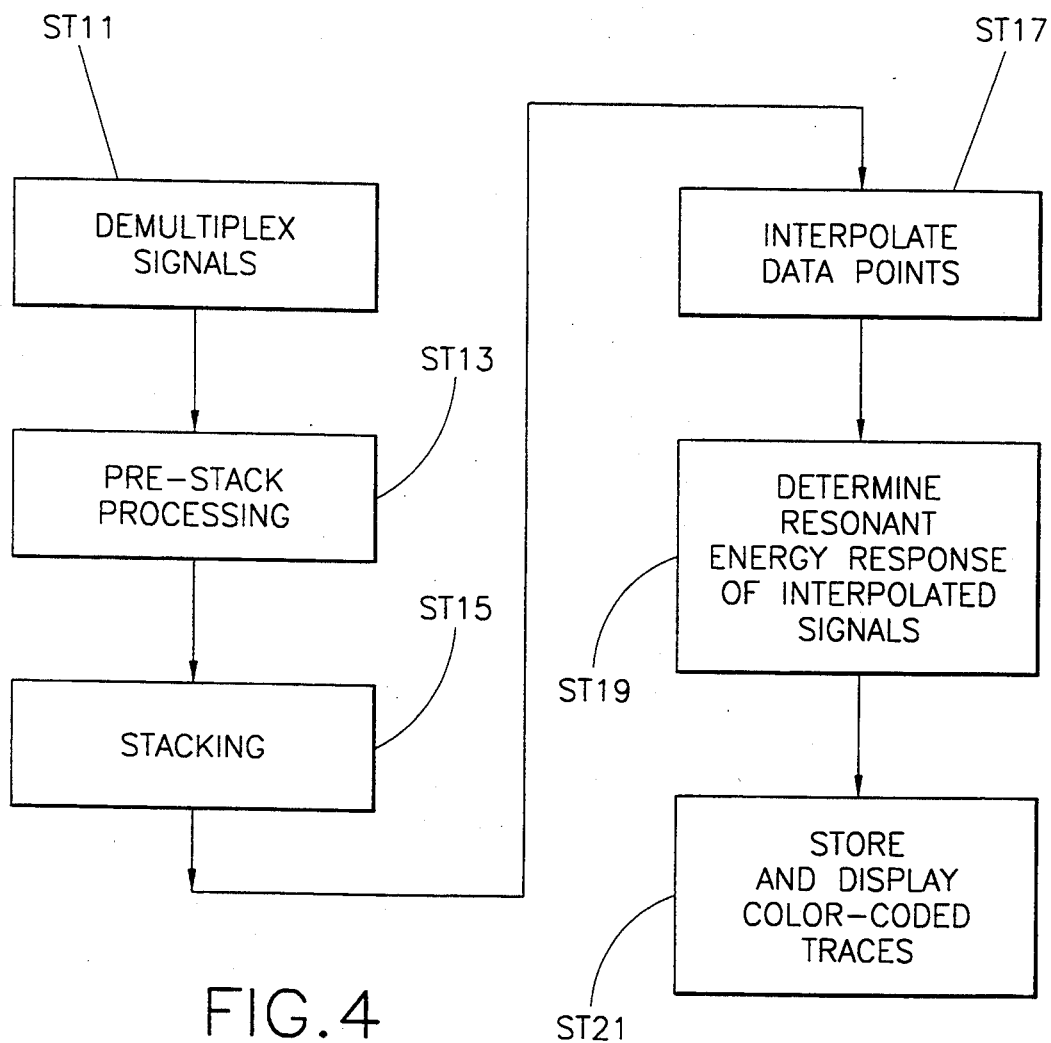
FIG. 4 is a flow chart illustrating the resonant energy analysis process in accordance with a preferred embodiment of the invention.

Referring now to FIG. 4, the downloaded signals are demultiplexed (ST11) and subjected to pre-stack processing (ST13) by CPU 15. Pre-stack processing is used to increase the signal to noise ratio while preserving as much of the signal characteristics as possible, with special emphasis on preserving the frequency content of the data. Deconvolution is used in this process to separate the signal wave form, or wavelet, from the subsurface reflectivity. Phase inversion deconvolution (PID), described in detail in Appendix A, is the preferred method of deconvolution in accordance with the present invention.

Once pre-stack processing is complete, data from two or more signals that correspond to the same offset-depth coordinate pair are averaged together, or "stacked" in accordance to the estimated velocity of sound wave propagation to enhance the signal to noise ratio (ST15). The stacking step is, however, optional. The pre-processed signals are then subjected to resonant energy analysis, which comprises an interpolation procedure (ST17) and a resonant energy response determination (ST19).

Figure 5:
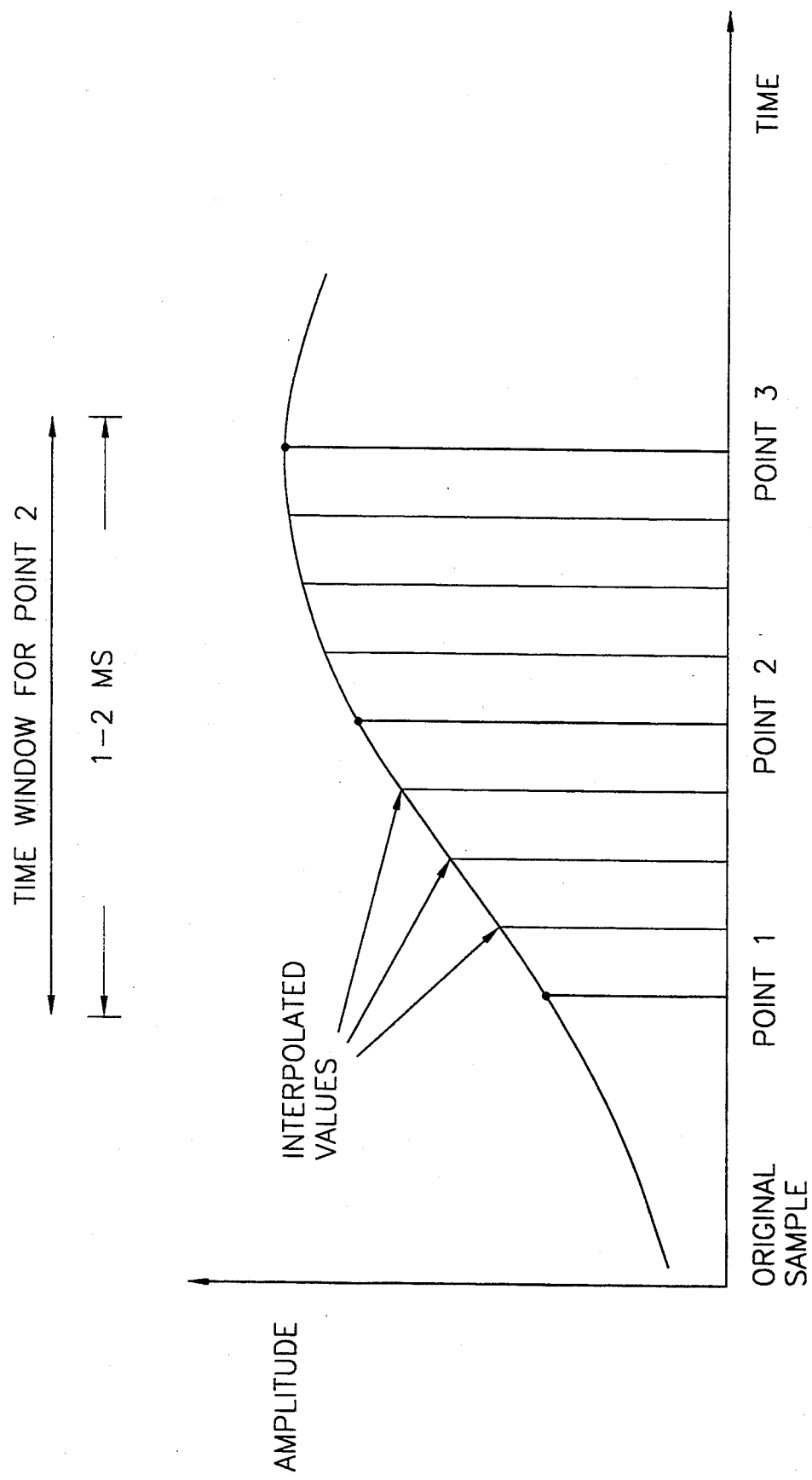
FIG. 5 is a graph showing interpolation of data points on a sample signal.

In the interpolation step (ST17), the seismic signal is interpolated in order to obtain a sampling rate sufficient to compute reliable spectra within small time windows (approximately 12 milliseconds). This is illustrated in FIG. 5. Interpolation is performed in three steps:

(1) The entire signal is converted to the frequency domain using a fast Fourier transform (FFT) procedure.
(2) The frequency domain signal is padded with zeroes between the original Nyquist frequency and the desired Nyquist frequency. The original Nyquist frequency is defined as the maximum frequency at which the signal can be recorded, and is equal to $$NYQUIST = \frac{1}{(2*SAMPLING\ RATE)}$$

The desired Nyquist frequency is defined by the interpolation ratio. In the preferred embodiment, the interpolation ratio is 112. Therefore, the desired Nyquist frequency is defined as 112 times the original Nyquist frequency.
(3) The obtained signal is converted back to the time domain using a reverse FFT procedure. The interpolated time signal is then used for the resonant energy analysis.

Figure 6A:
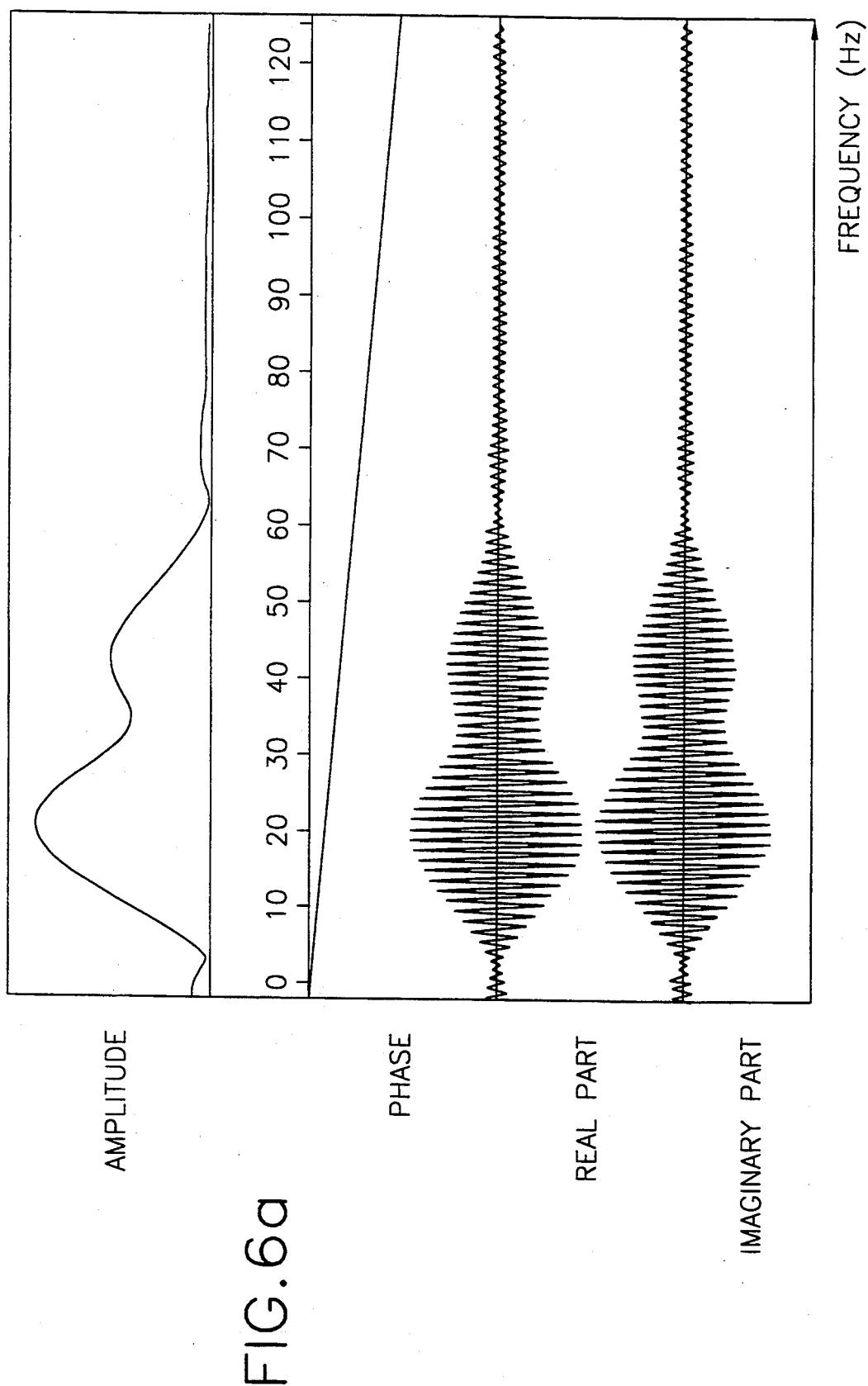
FIG. 6a is a graph illustrating a typical frequency spectrum corresponding to gas-bearing strata.
Figure 6B:
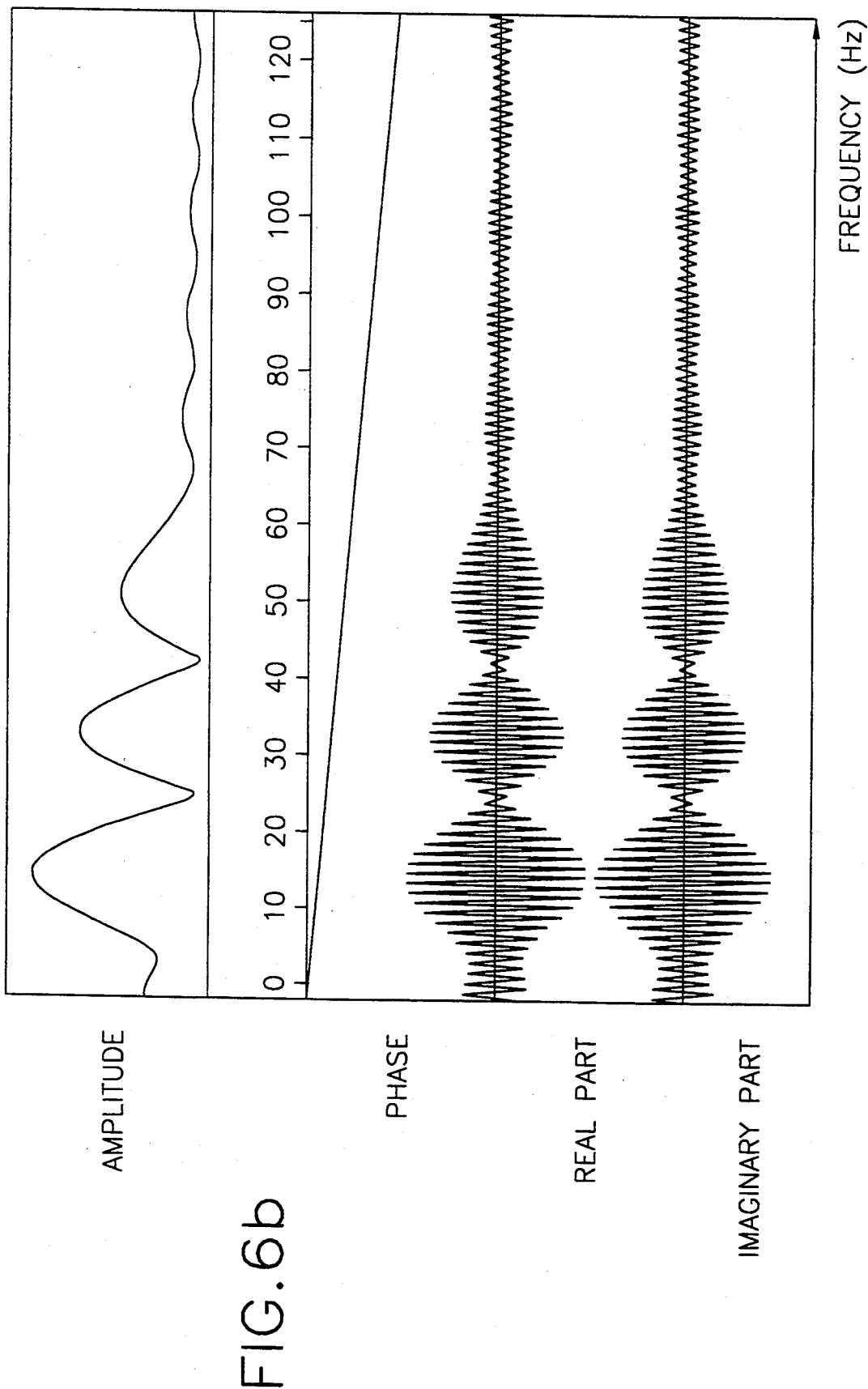
FIG. 6b is a graph illustrating a typical frequency spectrum corresponding to non-gas-bearing strata.
Figure 7A:
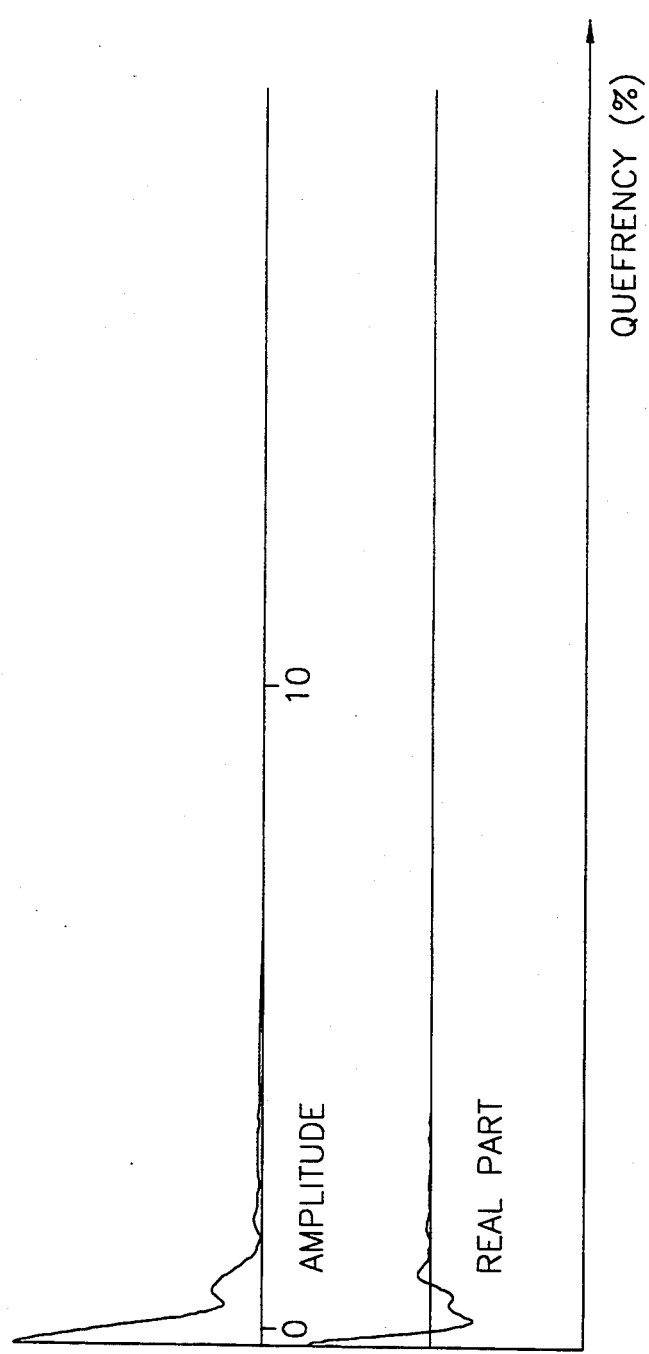
Figure 7B:
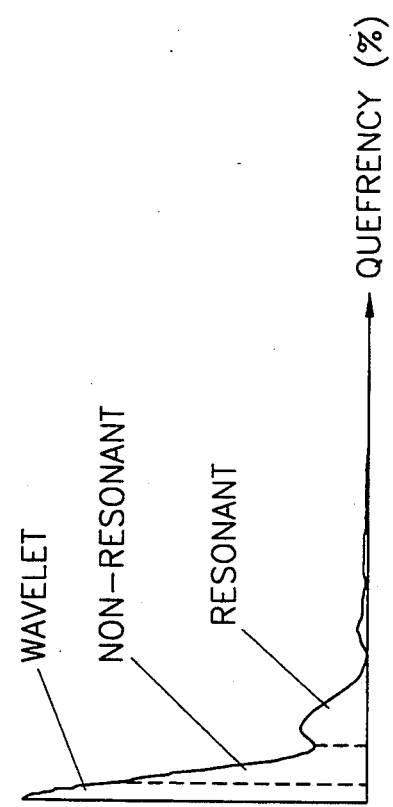
Figure 8A:
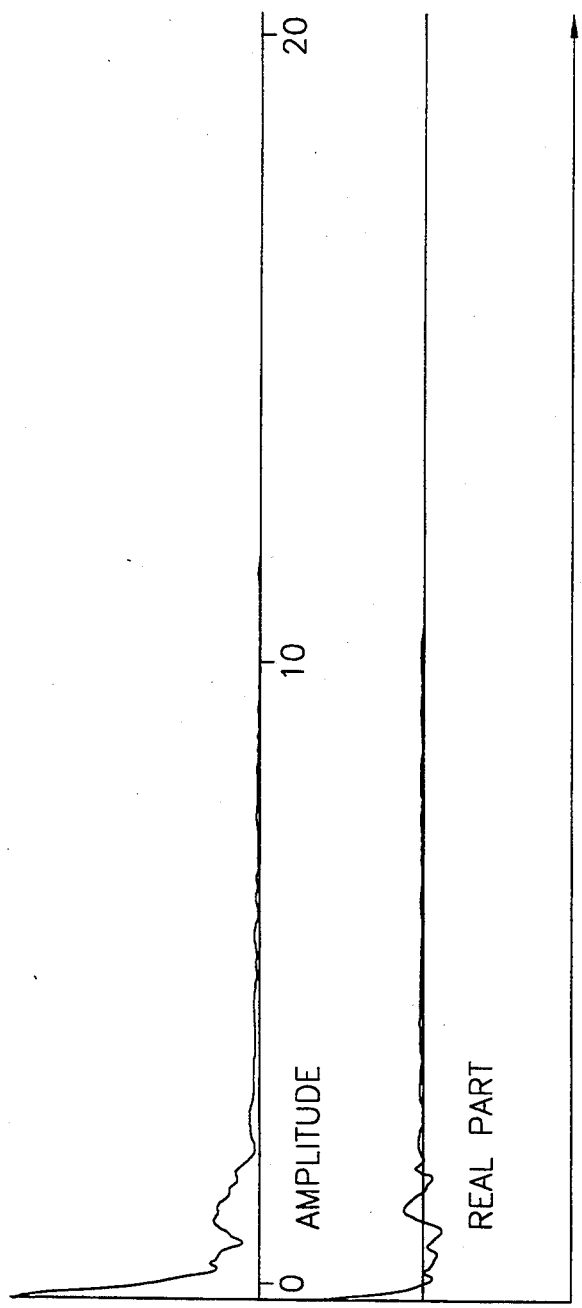
FIG. 8a is a graph illustrating a quefrency distribution of the data shown in FIG. 6b.
Figure 8B:
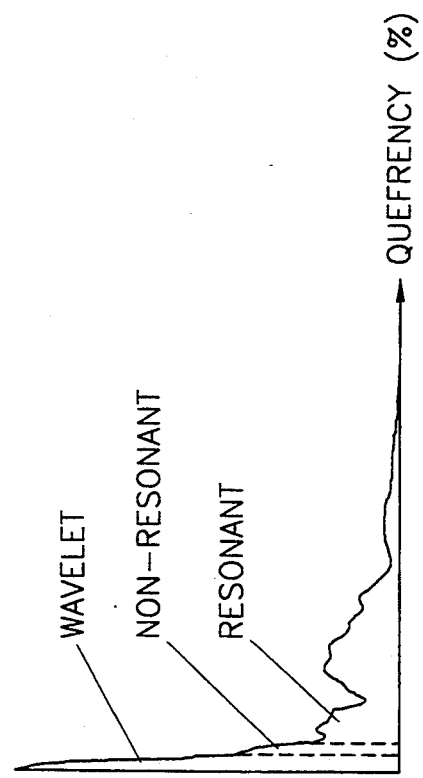

The resonant energy response step (ST19) determines the resonant energy response of the interpolated signal. Referring again to FIG. 5, a time window is chosen for each time in each point in the time domain corresponding to an original (non-interpolated) data point. The time window is approximately 12 milliseconds and is centered about the non-interpolated data point (about point 2 in the figure). The resonant energy response is then calculated as follows:

(1) The frequency domain spectrum within each time window is computed using a forward FFT procedure. A typical frequency domain spectrum obtained from a gas-bearing strata is illustrated in FIG. 6a. FIG. 6b illustrates a typical frequency spectrum obtained from non-gas-bearing strata.
(2) The obtained frequency spectrum is then mapped into the quefrency domain again using a forward FFT procedure. This results in separation of the resonant and non-resonant energy components. FIG. 7a shows a typical quefrency distribution obtained from gas-bearing strata while FIG. 8b shows a typical quefrency distribution obtained from non-gas-bearing strata. FIGS. 7b and 8b show the wavelet, non-resonant, and resonant portions of the distributions of FIGS. 7a and 8a, respectively.
(3) The areas under the non-resonant and resonant components are computed separately, and the ratio of resonant versus non-resonant areas is computed and stored as an array value corresponding to the original data point at the center of the time window chosen in FIG. 5. This ratio reflects the proportion of volume of gas to volume of solid component in the strata.
(4) An output trace is then created reflecting the values of the above ratios at each window location. This trace is then coded according to the values of the ratios, stored on hard storage device 13, and optionally displayed graphically on display 19 (ST21).

The above sequence is then repeated for each subsequent seismic signal.

As a result of the above procedure, a trace is obtained which is directly and reliably indicative of the proportion of gas to solid in a given strata. Thus, not only can gas deposits be located, the density of the deposit can be determined as well. Thus, the expense of a drilling well can be avoided if gas is not present in paying quantities.

The invention may be used in ways other than locating gas-bearing strata. For example, the invention may be used to derive the distribution of subsurface rock types, or lithology, directly from seismic data. Over time, a library of resonant signal profiles may be collected for known subsurface strata. For example, drilling sites which have been previously analyzed using resonant energy analysis may provide core samples or wireline well log data that allow positive identification of the source of resonant response profiles. Thus, development of a sufficiently large library will enable discrimination of distinct lithology types, and will enable mapping of subsurface lithologic variations from the seismic data alone. This approach may also be used to discriminate between liquids such as water or oil that reside in subsurface formations.

Moreover, the invention may be used to monitor subsurface aquifers for environmental purposes. Specifically, resonant energy analysis may be used to recognize resonant signatures associated with particular pollutants. Thus, contamination of the underground water supply can be detected and migration of pollutants can be tracked.

While specific embodiments of the invention have been disclosed and described above, the invention is not so limited, but instead is limited only by the scope of the appended claims.

APPENDIX A

Phase Inversion Deconvolution (PID) is based on the non-linear deconvolution technique as originally proposed by Oppenheim as an application of the theory of generalized superposition. This approach, known as homomorphic deconvolution offers a considerable advantage over the conventional methods because no prior assumption about the nature of the seismic wavelet of the impulse response of the transmission path (hereafter called the impulse train) need to be made.

The conventional approach to the homomorphic deconvolution is limited due to the extreme sensitivity of the cepstrum domain to noise present in the phase spectrum of the input signal. The conventional method of cepstrum computation linearizes the response of the convolved signal, but it can only separate the power spectrum into the wavelet and impulse train components in the linearized cepstrum domain.

In order to resolve this problem, PID assumes that the source-generated wavelet can be approximated as a causal time-sequence, and that the phase of the input signal can be minimized using the Schafer (1969) method. The phase spectrum of such a wavelet can be computed using the Hilbert transform, where the phase spectrum is replaced by the Hilbert transform. PID does not assume that the impulse train is causal. Instead, it extracts the effective wavelet as a causal component of the input signal. As a consequence of these assumptions, the PID technique can only extract the effective wavelet from the cepstrum domain and cannot extract the impulse train. The PID computes the effective wavelet by applying a non-symmetrical linear filter in the cepstrum domain. The negative part of the effective wavelet contains information necessary to attenuate peg-leg multiples and some short period multiples. The positive part is responsible for long- as well as short-period multiple attenuation.

In addition to the assumption concerning phase and the randomness of the impulse train of the earth system, conventional deconvolution suffers from the continuous alteration of the wavelet shape as a function of both propagation-time and offset.

In order to compensate for the waveform alteration with time, the deconvolution of the effective wavelet is performed in the frequency domain to take advantage of the fact that, combined with the Phase Inversion wavelet design, the deconvolution effectively handles non-stationary as well as stationary sequences. The reason for this is the range of changes in the smoothness of the wavelet power spectrum with time are still altered to a much smaller degree than the travel time alteration of the power spectrum of the impulse response train. The changes of the effective wavelet form with offset are compensated for by adjusting the phase spectrum of each signal based upon first arrivals.

The PID technique has been successfully applied to both land and marine data that suffered from severe multiple contamination. In certain cases where multiples are up to 50 times the signal (strong water bottom multiples), the multiples have been attenuated to half of the signal strength. The cepstrum filter parameters used for the effective wavelet extraction appear to be extremely stable and rarely require modification.

What is claimed is:

1. A method of locating high-density hydrocarbon deposits, comprising the steps of:
   a) obtaining analog signals representative of seismic information;
   b) converting said analog signals to digital signals;
   c) interpolating points along one of said digital signals within a predetermined time window;
   d) conducting a resonant energy analysis of the digital signal within said predetermined time window, said analysis comprising forming a plot of said digital signal in the quefrency domain, separating said plot into resonant and non-resonant portions, and determining a ratio of the area under the resonant portion to the area under the non-resonant portion;
   e) repeating steps c and d for each of said digital signals; and
   f) locating high-density hydrocarbon deposits by choosing areas having a high value of said ratio.

2. A method as claimed in claim 1, further comprising the step of stacking corresponding digital signals prior to interpolation.

3. A method as claimed in claim 2, further comprising the step of pre-stack processing of said digital signals.

4. A method as claimed in claim 3, wherein said pre-stack processing step includes performing phase-inversion deconvolution.

5. A method as claimed in claim 1, further comprising the step of color-coding said ratios and generating a trace of said ratios for a desired geographical area.

6. A method as claimed in claim 5, further comprising display of said trace on a color display.

7. An apparatus for locating high-density hydrocarbon deposits from analog signals, comprising:
   means for converting said analog signals to digital signals;
   means for interpolating points along one of said digital signals within a predetermined time window;
   means for conducting a resonant energy analysis of the digital signal within said predetermined time window, comprising:
      means for forming a plot of said digital signal in the quefrency domain,
      means for separating said plot into resonant and non-resonant portions, and
      means for determining a ratio of the area under the resonant portion to the area under the nonresonant portion; and
   means for locating high-density hydrocarbon deposits by choosing areas having a high value of said ratio.

8. An apparatus as claimed in claim 7, further comprising means for stacking corresponding digital signals prior to interpolation.

9. An apparatus as claimed in claim 8, further comprising pre-stack processing means.

10. An apparatus as claimed in claim 9, wherein said pre-stack processing means includes means for performing phase-inversion deconvolution.

11. An apparatus as claimed in claim 7, further comprising means for color-coding said ratios and generating a trace of said ratios for a desired geographical area.

12. An apparatus as claimed in claim 11, further comprising a color display for displaying said trace.

* * * * *